No. 895,916. PATENTED AUG. 11, 1908.
J. P. TURNER.
LIGHTNING ROD TERMINAL.
APPLICATION FILED AUG. 20, 1907.
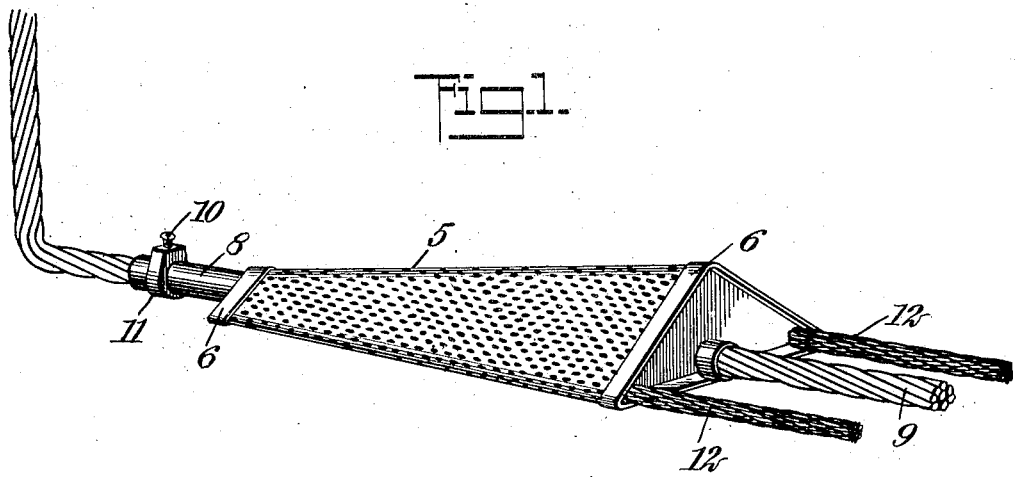
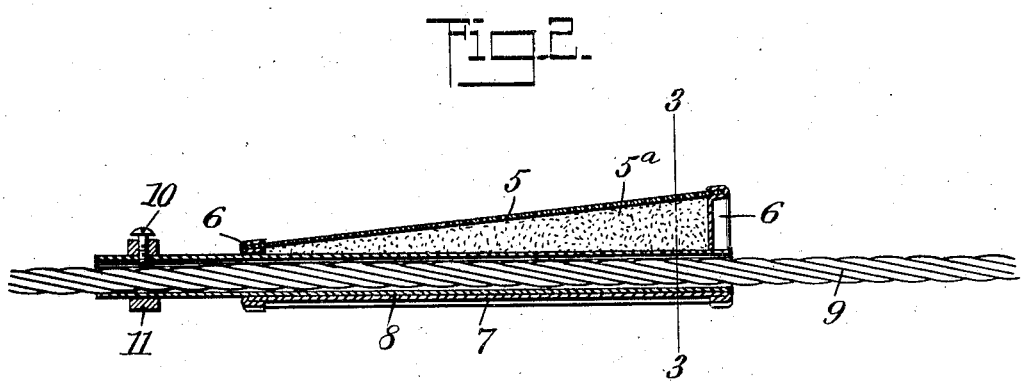
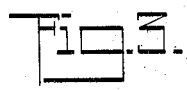
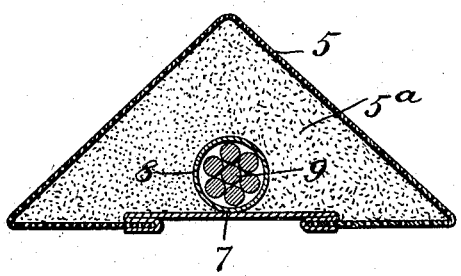
WITNESSES
INVENTOR
John P. Turner
BY
ATTORNEYS

UNITED STATES PATENT OFFICE.

JOHN P. TURNER, OF NEW YORK, N. Y.

LIGHTNING-ROD TERMINAL.

No. 895,916.

Specification of Letters Patent.

Patented Aug. 11, 1908.

Application filed August 20, 1907. Serial No. 389,349.

*To all whom it may concern:*

Be it known that I, JOHN P. TURNER, a citizen of the United States, and a resident of the city of New York, borough of Manhattan, in the county and State of New York, have invented new and useful Improvements in Lightning-Rod Terminals, of which the following is a full, clear, and exact description.

This invention is an improved ground terminal for lightning rods, and has for an object primarily to provide for the speedy dissipation of the current, whereby danger of the rod being overcharged and melted is avoided. This object I accomplish by passing the rod through a substantially horizontally disposed tapering perforated body filled with charcoal and having branch conductors leading from its enlarged end. The perforations in the body permit the water to seep through, maintaining the terminal in a high state of conductivity.

Reference is to be had to the accompanying drawings forming a part of this specification, in which similar characters of reference indicate corresponding parts in all the views.

Figure 1 is a perspective view of the preferred embodiment of my improved terminal which is embedded in the ground; Fig. 2 is a longitudinal vertical central section of the same; and Fig. 3 is a cross section on the line 3—3 of Fig. 2.

The terminal comprises a perforated hollow body 5 constructed of some conducting material, as sheet copper, and provided at opposite ends with inwardly dished heads 6, the sides of said heads being bent upon themselves to tightly embrace the edges of the body 5, as shown in Fig. 2. The body 5 uniformly tapers throughout its length and is preferably triangular in cross section with its small end arranged at the forward part of the terminal.

As will be observed from Fig. 3, the perforated portion of the body 5 is cut out or removed at the bottom in the direction of the terminal's length, and is replaced by an imperforate plate 7 of copper or other conducting sheet metal, having the sides thereof reversely bent for embracing the opposed edges of the perforated portion of the body. The body is filled with pulverized charcoal 5ª and is provided in substantial contact with the plate 7 with a longitudinal centrally arranged tube 8 which passes the full length of the body through both heads 6 and extends some distance beyond the small or forward head. Through this tube passes a lightning rod 9, the latter being pressed against the bore of the tube in advance of the body 5 by a set-screw 10 which is threaded through a collar 11, the said collar being carried on the tube exteriorly thereof.

At the opposite sides of the enlarged dished heads 6 are brazed, or otherwise suitably secured, branch conductors 12 which relieve the rod and the body of a portion of the charge, and assist them in diffusing the current into the ground. The moisture in the ground over the terminal will be shed to the opposite sides of the body 5, in view of its triangular construction, where it will pass into the perforations and seep through the charcoal, maintaining the latter in a high state of conductivity. The charcoal will at all times be especially moist around the tube 8 since the water will be prevented from escaping by reason of the imperforate portion 7 of the base.

The tapering construction of the body 5 obviously has the effect of disseminating or spreading the current over a greater area as the current passes in the direction of its enlarged end, and also gives an increased contact with the ground in which the terminal is embedded, both of which contribute to facilitate the passage of the current into the ground.

The terminal as shown and described while being my preferred practical embodiment of the same may be modified in the details of construction without departing from the nature of the invention as defined in the claims annexed.

Having thus described my invention, I claim as new and desire to secure by Letters Patent:

1. A terminal comprising a tapered perforated body of sheet metal filled with carbon and having branch conductors leading from the opposite sides of its enlarged end, said body having a base provided with a longitudinally arranged imperforate plate forming the central portion of the base, a tube passing through said body in substantial contact with the imperforate plate, a lightning rod passing through the said tube, and a collar carried by said tube in advance of said body, having a set-screw for forcing the rod into contact with the bore of the tube.

2. A terminal comprising a perforated hollow body of sheet metal filled with carbon, a conducting tube passing longitudinally through said body, a lightning rod passing through the tube, and means for forcing the rod into contact with the bore of the tube.

3. A lightning rod terminal comprising a perforated hollow conductor, a conducting tube passing longitudinally through said body with the side thereof in contact with a longitudinal wall of the hollow conductor, and a lightning rod passing through the tube having contact therewith.

4. A terminal comprising a tapering perforated body of sheet metal substantially horizontally disposed and of triangular cross section, a tube passing longitudinally through the body in substantial contact therewith, a lightning rod passing through the tube, and branch conductors leading from the body.

5. A terminal comprising a tapering perforated body of sheet metal substantially horizontally disposed and having an imperforate plate extending longitudinally of the body and forming a part of the bottom thereof, a tube passing through the body in substantial contact with said plate, a lightning rod passing through the tube, and branch conductors leading from the enlarged rear end of the body.

6. A terminal comprising a hollow conductor filled with a carbonaceous material, a conducting tube in contact with one of the longitudinal walls of the conductor, and a lightning rod passing into the tube in substantial contact therewith.

In testimony whereof I have signed my name to this specification in the presence of two subscribing witnesses.

JOHN P. TURNER.

Witnesses:
   THOMAS J. HEWITT,
   JAMES M. O'CONNOR.